June 29, 1965 C. V. EVERETT ETAL 3,191,686
BEET HARVESTER WITH STEERABLE PULLER WHEELS
Filed Sept. 26, 1962 4 Sheets-Sheet 1
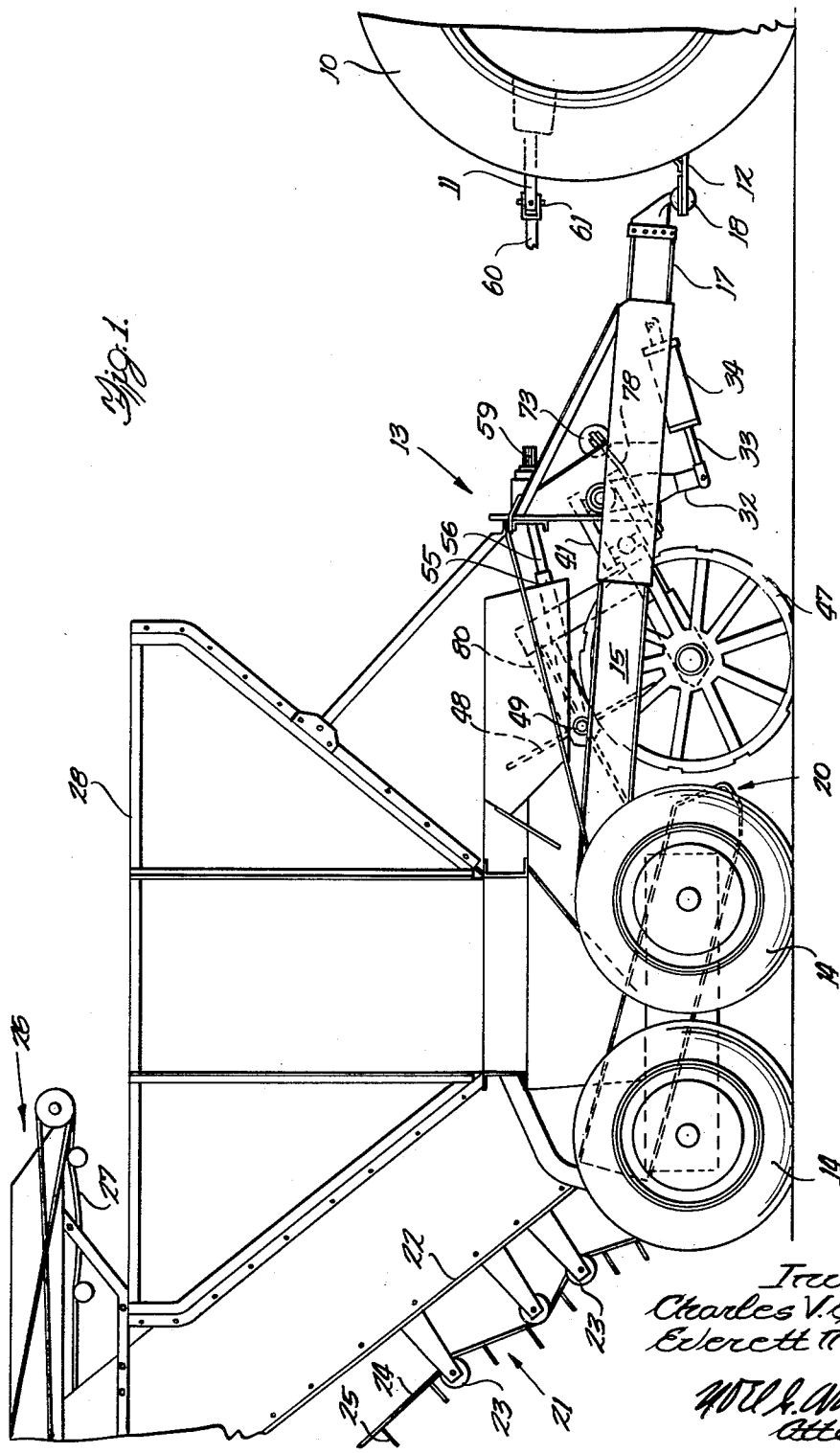

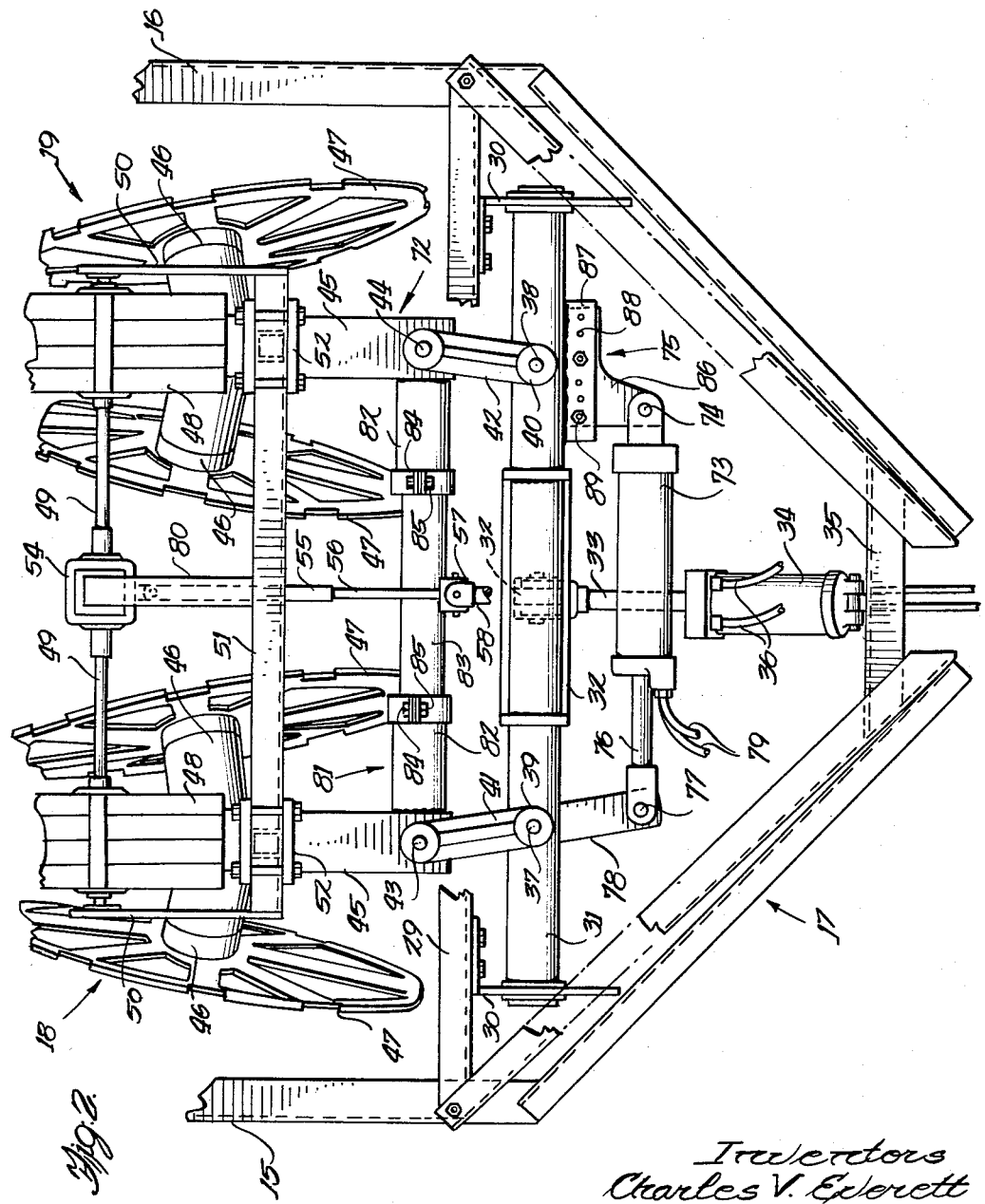

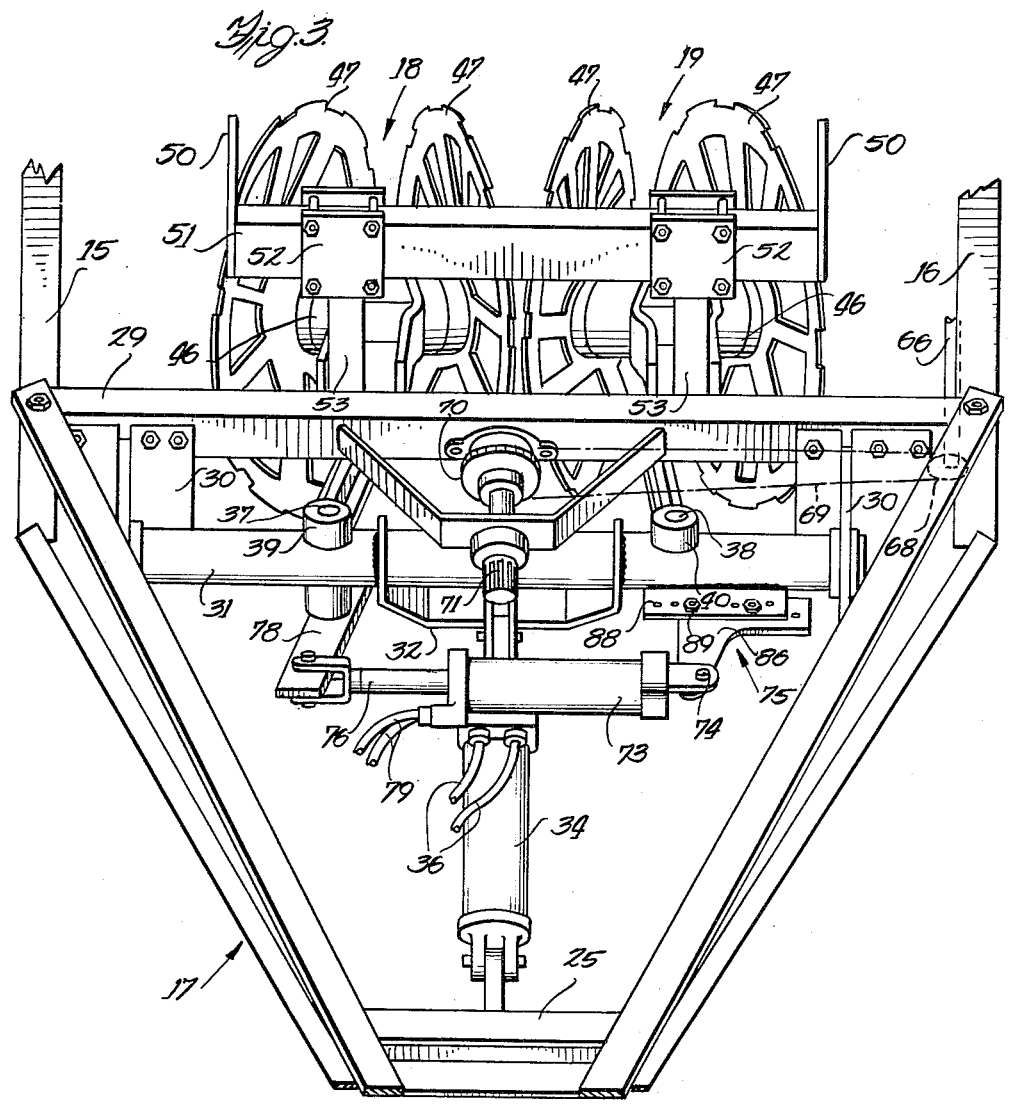

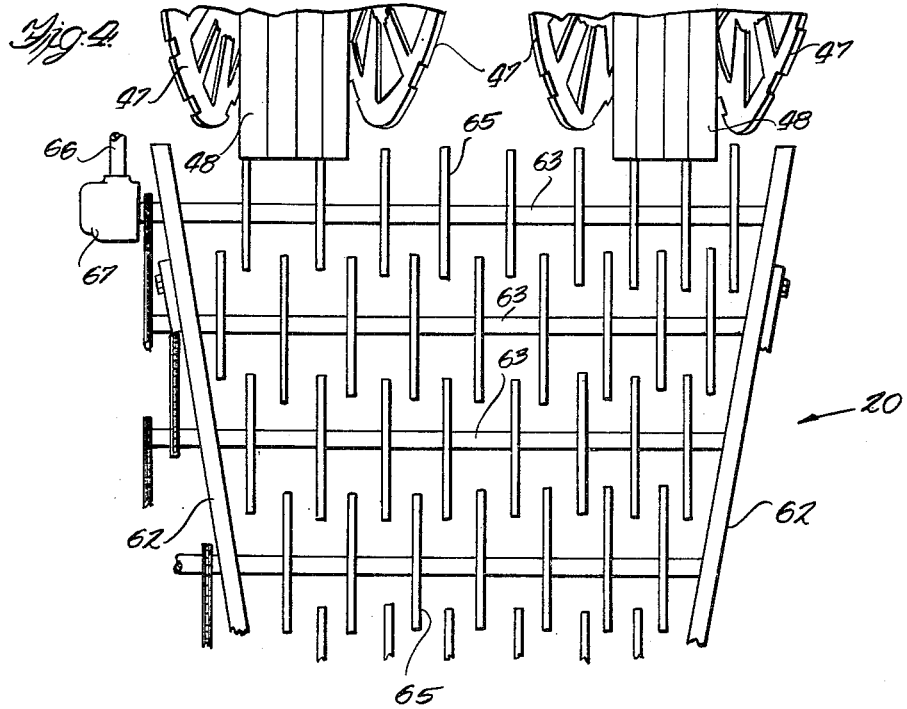
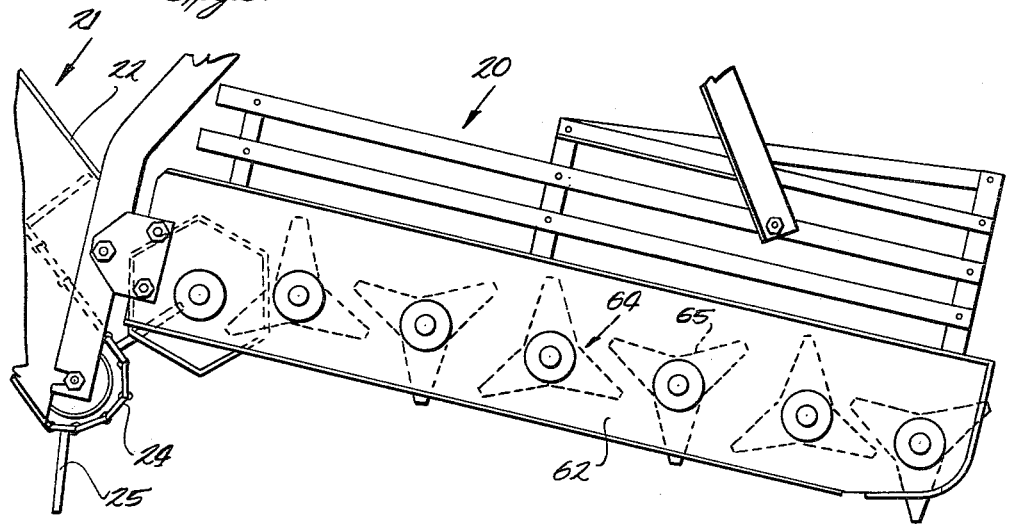

United States Patent Office 3,191,686
Patented June 29, 1965

3,191,686
BEET HARVESTER WITH STEERABLE
PULLER WHEELS
Charles V. Everett, Warrenville, and Everett M. Clark, Naperville, Ill., assignors to International Harvester Company, Chicago, Ill., a corporation of New Jersey
Filed Sept. 26, 1962, Ser. No. 226,205
13 Claims. (Cl. 171—58)

This invention relates to agricultural implements and particularly to sugar beet harvesters. Sugar beets are harvested by machines mounted on wheeled vehicles, the wheels usually traveling in the depressed area between the raised crop rows while the beet digging or pulling devices run in the row.

Beet harvesters are generally large and heavy and the power for propelling them over a field is usually provided by tractors having wheels which are also disposed between crop rows. Beets do not grow in a uniform line in the row in which they are planted, the mature roots appearing irregularly in a wide area of the crop row, the tops of some beets appearing in the center of the row while others grow to the sides.

Mature beets are dug or lifted from the ground by implements such as earth penetrating shovels and wheels which diverge forwardly and literally squeeze the beet out. It is customary to fix these beet pulling devices on the frame of the machine to travel in the crop row, the digger being able only to remove those beets directly in its line of travel while missing those that are not in line. The resulting loss causes the operator to attempt to steer his tractor or his harvesting equipment or both in an effort to remove all of the beets, however, laterally displaced they may be in the row. The result is that the wheels of the tractor or harvesting apparatus are turned into the row, damaging beets and rendering steering of the machine difficult.

The present invention therefore has for its object the provision of an improved beet harvesting machine incorporating therein means by which the beet digging apparatus is steered in the row from one side thereof to the other independently of the propelling vehicle or of the implement wheeled frame.

Another object of the invention is the provision in a harvesting machine for beets and the like having a wheeled frame and driven beet receiving and conveying means stationarily mounted thereon, of novel beet digging and elevating means mounted on the frame for controlled lateral shifting from side to side in the crop row to remove the beets from the ground and deliver them to the receiving and conveying means.

Another object of the invention is the provision, in a beet harvesting machine including a frame having supporting wheels arranged to ride in the furrows between crop rows and beet receiving means carried by the frame, of a novel beet lifting unit arranged to travel in the crop row and consisting of a lateral spaced pair of ground penetrating puller wheels mounted on the frame in advance of the beet receiving means, and a driven rotary flail device disposed between the puller wheels to strike the beets and direct them to the receiving means, means being provided for laterally shifting the puller wheel and flail unit in the row.

Another object of the invention is the provision of a steerable puller wheel unit for beet harvesting apparatus and novel means for mounting the puller wheel unit on its supporting frame to accomodate both lateral and vertical swinging thereof relative to the supporting frame.

Other objects and advantages of the invention will become clear from the following detailed description when read in conjunction with the accompanying drawings, wherein:

FIGURE 1 is a view in side elevation, with parts removed, of the rear end of a tractor having connected thereto in draft receiving relation a beet harvesting machine incorporating the features of this invention;

FIGURE 2 is a plan view on an enlarged scale and with parts removed, of a portion of the beet lifting apparatus shown in FIGURE 1 showing laterally spaced pairs of beet puller wheels adjusted for wide row spacing;

FIGURE 3 is a view in perspective of the beet pulling apparatus in FIGURE 1, with parts removed, showing the position of the beet puller wheels adjusted for narrow row spacing;

FIGURE 4 is a diagrammatic plan view of the beet cleaning unit arranged to receive and convey rearwardly beets removed from the ground by the digging devices, and FIGURE 5 is an enlarged view in side elevation of the cleaning bed shown in FIGURES 1 and 4.

In the drawings the numeral 10 designates a tractor having power operated drive means in the form of a power take-off shaft 11 and a drawbar 12. The trailing beet harvesting machine of this invention comprises a relatively stationary frame 13 mounted upon laterally spaced pairs of wheels 14 and includes laterally spaced frame members 15 and 16 which converge forwardly to form a hitch structure 17 having a ball and socket connection at 18 with drawbar 12 of the tractor to accommodate both lateral and vertical swinging movement of the harvesting machine relative to the tractor to accommodate the implement to changes in ground contour.

Beets are grown on flat land, and upon ridges of earth having furrows therebetween in which travel the laterally spaced wheels 10 and 14 of the tractor and the harvesting machine. This facilitates steering the tractor and implement in the field, and the beets are lifted from the ground by laterally spaced digger or puller wheel units designated at 18 and 19 arranged to travel in the crop rows.

Beets removed by the puller wheel units 18 and 19 are directed rearwardly to a cleaning bed unit 20 adapted to receive the beets from the puller wheel units 18 and 19 and convey them rearwardly to an upwardly directed elevator 21 comprising a frame 22 carried by the main supporting frame 13 and having mounted thereon idler pulleys 23 over which is trained a conventional endless elevator chain 24 to which are secured beet pick-up members 25.

Beets picked up by elevator 21 from the receiving and conveying device 20 are carried upwardly and delivered to a horizontal conveyor 26 including an endless chain bed 27 upon which the beets are discharged. Beets delivered to the horizontal conveyor 27, are discharged by gravity into an accumulating tank or receptacle 28 mounted on the main frame 13 from which they are later discharged by means, not shown, forming no part of this invention.

The forward ends of the side frame members 15 and 16 are connected by a cross-brace 29 having secured thereto and to the hitch section 17 a pair of laterally spaced L-shaped brackets 30, apertured to rotatably receive the ends of a rockshaft 31, to which is secured, centrally thereof a Y-shaped yoke 32 forming a radial arm to which is pivotally connected the forward end of the piston rod 33 slidable in a hydraulic cylinder 34 anchored to a cross brace 35 at the forward end of the hitch structure 17. Fluid under pressure is supplied to the cylinder 34 through hose lines 36 from a source of fluid under pressure, not shown, on the tractor, to extend and retract the piston rod 33 and to rock the shaft 31.

On opposite sides of the yoke 32 shaft 31 is apertured to receive generally vertically extending pivot pins 37 and 38, upwardly extending bosses 39 and 40 being provided to receive the upper ends of the respective pivot pins.

To bosses 39 and 40 are affixed rearwardly extending link members 41 and 42, respectively, the rear ends of which are mounted upon pivot pins 43 and 44 carried by the forward ends of beet lifter supporting beams 45.

Beams 45 form a part of the beet puller units 18 and 19, and since these units are substantial duplicates a description of one will suffice for both. To the rear end of each of the beams 45 is secured a pair of downwardly and rearwardly angled wheel supports 46 upon the outer ends of which are rotatably mounted a pair of forwardly diverging beet puller wheels 47. The puller wheels 47 of units 18 and 19 penetrate the ground in adjacent crop rows and lift the beets therefrom. The beets are carried upwardly and rearwardly between the puller wheels 47 and are engaged by flexible flails 48, preferably of rubber or the like, mounted adjacent one end of a shaft 49, one end of which is rotatably mounted in the end of a rearwardly extending arm 50, the forward end of which is affixed to one end of a connecting bar 51 having an arm 50 secured to each end thereof. Bar 51 is secured by clamps 52 to the upper ends of standards 53, the lower ends of which are affixed to the beams 45.

The inner ends of each of the shafts 49, one of which is provided for each set of flails 48, is received in a gear housing 54 through which drive is transmitted to the shafts 49 by pivotal connection to a sleeve member 55 having a square bore to slidably receive a square drive shaft 56 connected by a universal joint 57 with a shaft 58 which, in turn, is connected through a stub shaft 59 mounted on the main frame 13 to a shaft section 60 which is connected by a universal joint 61 with the power take-off shaft 11.

The flail units 48 are driven at sufficient rotary speed to strike the beets between puller wheels 47 and throw them rearwardly upon the receiving and conveying device 20 which includes laterally spaced frame plates 62 carried by the main frame 13 and having rotatably mounted therein the ends of a plurality of longitudinally spaced transversely extending shafts 63 upon which are mounted rotary members 64 each having a plurality of radial arms 65 driven from a shaft 66 the rear end of which is received in a gear box 67 and the forward end of which carries a sprocket wheel 68 connected by a transverse endless chain indicated at 69 to a sprocket wheel 70 mounted on the sub shaft 71. Beets thrown upon the cleaning bed 20 are struck by the arms 65 and conveyed rearwardly for delivery to conveyor 21 the beets being agitated in the process, clods and trash removed from the beets by engagement with flails 48 and rotors 64 falling through to the ground.

The support for puller wheel units 18 and 19 including cross bar 51, standards 53, beams 45 and links 41 and 42 form a subframe generally designated by the numeral 72, mounted on the main frame 13 for lateral shifting or swinging with links 41 and 42 about the pivots thereof on pins 37 and 38. The subframe 72 is likewise swingable in a vertical plane, as pointed out before, about the axis of rockshaft 31 to raise and lower the beet pulling units.

Lateral swinging of the subframe 72 is selectively controlled by the tractor operator to steer the puller units 18 and 19 from one side of the crop row to the other to insure the removal of beets wherever they may be in the crop row through actuation of a hydraulic cylinder 73 pivotally connected by a pin 74 to a bracket 75 mounted on the rockshaft 31 and having a piston rod 76 slidable therein and connected by a pin 77 to the forwardly projecting end of a lever 78 affixed to link member 41, the lower end of pin 37 being extended to pass through the lever 78. Fluid under pressure is supplied to cylinder 73 through hose lines 79 from a source of fluid under pressure, not shown, on the tractor.

Housing 54 contains conventional gearing for driving shafts 49 in a clockwise direction viewed in FIGURE 1 to strike the beets lifted by the puller wheels 47 and to discharge them rearwardly. The specific construction of the flails 48 forms no part of this invention, although it may be understood that the flails are arranged in groups circumferentially spaced about the axis of shaft 49 and that the individual group of flails is wide enough to span the space between the pairs of puller wheel units 18 and 19 to discharge rearwardly all of the beets raised by the puller wheel units. Housing 54 is affixed to the rear end of a bracket 80 secured to cross bar 51.

Adjustment of the lateral spacing between units 18 and 19 from the spacing shown in FIGURE 2 to that shown in FIGURE 3, for example, to conform to the spacing of the crop rows in the field, is accomplished by the provision of an adjustable brace 81 extending between the forward ends of beams 45 and comprising a pair of sleeve members 82 affixed, as by welding, to the respective beams 45 and slidably receiving the ends of a shaft 83 to which the sleeves are secured by clamps 84. The clamps are released by loosening bolts 85 to permit adjustment of shaft 83 in the sleeve 82.

To compensate for this variation in the spacing between the puller wheel units 18 and 19, bracket 75 to which cylinder 73 is anchored includes an L-shaped member 86 adjustably secured to a plate 87 affixed, as by welding, to the rockable shaft member 31 and having a plurality of apertures 88 therein registerable with corresponding apertures in member 86 and adjustably held in a selected position by bolts 89. By virtue of this mounting of cylinder 73 on the rockable member 31, the cylinder and piston 73, 76 rock about the axis of shaft 31 as a unit with subframe 72 when cylinder 34 is actuated to raise and lower the puller wheels.

The width of the forward portion of the receiver and conveyor 20 is sufficient to accommodate the adjustments in spacing between puller wheel units 18 and 19, and the side walls 62 of the member 20 converge rearwardly for delivering beets to the elevator 21.

It is believed the construction and operation of the improved beet harvesting machine of this invention will be clearly understood from the foregoing description. It should likewise be understood that the invention has been described in its preferred embodiment only, and that modifications may be made therein without departing from the spirit of the invention or the scope of the appended claims.

What is claimed is:

1. Beet harvesting apparatus including a mobile frame having laterally spaced supporting wheels thereon arranged to ride in furrows between crop rows, longitudinally extending linkage pivotally connected at one end to said frame on a vertical axis for lateral swinging relative thereto, a pair of laterally spaced puller members carried by the other end of said linkage for lateral swinging therewith, a hydraulic cylinder carried by said frame and operatively connected to said linkage for laterally swinging said linkage upon actuation of said cylinder to steer said puller wheels in the crop row.

2. The invention set forth in claim 1, wherein said linkage includes generally parallel links, one of which is extended to form a lever to which said cylinder is connected to laterally swing the puller members.

3. The invention set forth in claim 1, wherein a shaft is rockably mounted on the frame on a transverse axis, and the end of said linkage remote from said puller members is pivotally connected to said shaft for lateral swinging relative thereto and for vertical swinging in response to rocking said shaft.

4. The invention set forth in claim 3, wherein said hydraulic cylinder is mounted on said rock shaft and operatively connected to said linkage to effect lateral swinging thereof and another hydraulic cylinder is mounted on the frame and operatively connected to said shaft for rocking the latter about its axis to vertically swing said puller members.

5. A beet harvester having a mobile frame, beet lifting means carried by the frame, driven beet receiving and conveying means relatively stationarily mounted on the frame rearwardly of said lifting means, said beet lifting means comprising a pair of rearwardly diverging puller members adapted to penetrate the ground, remove the beets therefrom and deliver them to said receiving and conveying means, means for mounting said puller members on the frame for lateral swinging movement relative to the frame and to said receiving and conveying means, and power operated means mounted on the frame and operatively connected to the puller members to prevent free lateral swinging thereof, said power operated means being operable to effect a controlled lateral swinging thereof to guide said puller members in the crop row.

6. A beet harvester, comprising a main frame having laterally spaced supporting wheels thereon arranged to ride in furrows between crop rows, a subframe mounted on the main frame, a pair of laterally spaced beet puller wheels carried by the subframe and arranged to travel in the crop row to lift the beets from the ground, a beet receiving and conveying device mounted on the main frame rearwardly of the puller wheels, a driven rotary flail assembly mounted on the subframe above the axis of the puller wheels to strike the beets lifted by the puller wheels and discharge them upon the receiving and conveying device, the means mounting the subframe on the main frame including a rockable member rockably mounted on the main frame on a transverse axis and connected to the puller wheels and flail assembly to accommodate movement thereof with the rockable member in a vertical plane, the connection between the puller wheels and the rockable member including vertical pivot means accommodating lateral swinging of the puller wheels and flail assembly relative to the main frame and said receiving and conveying device, and power transmitting means carried by the main frame and operatively connected to the subframe to hold the puller wheels against lateral swinging and to selectively steer the puller wheels from side to side in the crop row.

7. A beet harvester, comprising a main frame having laterally spaced supporting wheels thereon arranged to ride in furrows between crop rows, a subframe mounted on the main frame, a pair of laterally spaced beet puller wheels carried by the subframe and arranged to travel in the crop row to lift the beets from the ground, a beet receiving and conveying device mounted on the main frame rearwardly of the puller wheels, a driven rotary flail assembly mounted on the subframe above the axis of the puller wheels to strike the beets lifted by the puller wheels and discharge them upon the receiving and conveying device, the means mounting the subframe on the main frame including a rockable member rockably mounted on the main frame on a transverse axis and connected to the puller wheels and flail assembly to accommodate movement thereof with the rockable member in a vertical plane, the connection between the puller wheels and the rockable member including vertical pivot means accommodating lateral swinging of the puller wheels and flail assembly relative to the main frame and said receiving and conveying device, power transmitting means carried by the main frame and operatively connected to the subframe to hold the puller wheels against lateral swinging and to selectively steer the puller wheels from side to to side in the crop row, and separate power transmitting means carried by the main frame and operatively connected to the rockable member to rock the latter to raise and lower the subframe.

8. A beet harvester, comprising a main frame having laterally spaced supporting wheels thereon arranged to ride in furrows between crop rows, a subframe mounted on the main frame, a pair of laterally spaced beet puller wheels carried by the subframe and arranged to travel in the crop row to lift the beets from the ground, a beet receiving and conveying device mounted on the main frame rearwardly of the puller wheels, a driven rotary flail assembly mounted on the subframe above the axis of the puller wheels to strike the beets lifted by the puller wheels and discharge them upon the receiving and conveying device, the means mounting the subframe on the main frame including a rockable member rockably mounted on the main frame on a transverse axis and connected to the puller wheels and flail assembly to accommodate movement thereof with the rockable member in a vertical plane, the connection between the puller wheels and the rockable member including vertical pivot means accommodating lateral swinging of the puller wheels and flail assembly relative to the main frame and said receiving and conveying device, a first hydraulic cylinder operatively connected to the main frame and to the subframe to hold the puller wheels against lateral swinging and to selectively steer the puller wheels and flail assembly from side to side in the crop row, and a second hydraulic cylinder operatively connected to the main frame and to the rockable member to raise and lower the subframe.

9. The invention set forth in claim 8, wherein the rockable member includes a rockshaft rockably mounted on the main frame and said first hydraulic cylinder for laterally swinging the puller wheels is mounted on the rockshaft and is rockable therewith upon actuation of the second cylinder to raise and lower the subframe.

10. A beet harvester having a wheel supported main frame adapted for connection in draft receiving relation to a tractor having power operated drive means thereon, a subframe mounted on the main frame for lateral swinging movement relative to the main frame, driven beet receiving and conveying means relatively stationarily mounted on the main frame, beet lifter means carried by the subframe to travel in the crop row and lift the beets from the ground, a rotary flail device mounted on the subframe and engageable with the beets removed from the ground by said lifter means to discharge them rearwardly to said receiving and conveying means, and means forming a flexible drive connection between said power operated drive means and said flail device to rotate the latter throughout the range of lateral swinging movement thereof.

11. The invention set forth in claim 10, wherein a hydraulic cylinder is mounted on and operatively connected between the main frame and the subframe to effect a controlled lateral shifting of said puller means and flail device in the beet row.

12. The invention set forth in claim 11, wherein laterally spaced beet puller means are provided on the subframe to travel in adjacent crop rows and means are provided for adjusting the lateral spacing therebetween to compensate for variations in the spacing between crop rows.

13. The invention set forth in claim 12, wherein the mounting of the hydraulic cylinder on the main frame includes an adjustable connection accommodating variations in the lateral spacing between said beet puller means.

References Cited by the Examiner

UNITED STATES PATENTS 2,944,611  7/60  Rollins _____ 171—58
2,972,383  2/61  Erdman _____ 171—58

FOREIGN PATENTS 1,178,842  12/58  France.

ANTONIO F. GUIDA, ARNOLD RUEGG, Examiners.

T. GRAHAM CRAVER, Primary Examiner.